United States Patent [19]

Watanabe et al.

[11] Patent Number: 4,728,687

[45] Date of Patent: Mar. 1, 1988

[54] SILICONE ELASTOMER COMPOSITION

[75] Inventors: Junichiro Watanabe; Yuichi Funahashi, both of Ohta; Kazuo Sugiura; Hironori Matsumoto, both of Tokyo, all of Japan

[73] Assignee: Toshiba Silicone Co., Ltd., Japan

[21] Appl. No.: 9,597

[22] Filed: Jan. 29, 1987

Related U.S. Application Data

[63] Continuation of Ser. No. 787,233, Oct. 15, 1985, abandoned.

[30] Foreign Application Priority Data

Oct. 22, 1984 [JP] Japan ................................ 59-221540

[51] Int. Cl.$^4$ .............................................. C08K 3/34
[52] U.S. Cl. ..................................... 524/493; 524/423; 524/424; 524/425; 524/430; 524/431; 524/432; 524/436; 524/448; 524/496; 528/24; 528/32
[58] Field of Search .................... 528/24, 32; 524/493, 524/496

[56] References Cited

U.S. PATENT DOCUMENTS 3,261,803  7/1966  Naughton ............................ 260/37
3,855,171 12/1974  Wegehaupt et al. ................. 528/24
3,865,788  2/1975  Gaylord .............................. 528/24
4,640,968  2/1987  Watanabe et al. ................... 528/32

FOREIGN PATENT DOCUMENTS 750534  6/1956  United Kingdom .
821477 10/1959  United Kingdom .

*Primary Examiner*—Melvyn I. Marquis
*Attorney, Agent, or Firm*—John W. Harbour

[57] ABSTRACT

A vulcanizable silicone elastomer composition which has novel crosslinking points comprises (A) 100 parts by weight of a polyorganosiloxane having a polymerization degree of at least 100, wherein the organic groups are selected from monovalent substituted and unsubstituted hydrocarbon groups and are attached to silicon atoms at a rate, on average, in the range of 1.98 to 2.02 per silicon atom and at least two of the organic groups are monovalent hydrocarbon groups possessing at least five carbon atoms and a carbon-carbon double bond issuing from a silicon atom through at least one carbon atom, (B) 5 to 200 parts by weight of an inorganic filler having a specific surface area of at least 50 m$^2$/g, and (C) 0.05 to 15 parts by weight of an organic peroxide.

4 Claims, No Drawings

SILICONE ELASTOMER COMPOSITION

This application is a continuation of application Ser. No. 787,233 filed Oct. 15, 1985, now abandoned. and a platinum compound and molding the obtained blend.

The present application claims priority of Japanese patent application Ser. No. 84/221540 filed Oct. 22, 1984.

BACKGROUND OF THE INVENTION

This invention relates to a silicone elastomer composition possessing novel crosslinking points, and more particularly, to a silicone elastomer composition possessing two or more organo groups including at least five carbon atoms and a carbon-carbon double bond bonding to a silicon atom via at least one carbon atom as the crosslinking points thereof.

Conventional silicone elastomer compositions have vinyl groups as their crosslinking groups. A shaped article of silicone elastomer, therefore, can be obtained by blending a vinyl group-containing polyorganosiloxane as a base polymer with an organic peroxide as a vulcanizer and molding the obtained blend, or blending with a polyorganohydrogensiloxane and a platinum compound and molding the obtained blend. The organic peroxides available as the aforementioned vulcanizer are divided into two types, acyl type which evolves carboxylic acids and non-acyl type which evolves alcohols.

Among the means of molding silicone elastomer into a desired shape is included hot air vulcanization which is performed in an oxygen-containing atmosphere (hereinafter referred to as "HAV"). When the vulcanization is performed by HAV, there ensures the problem that the surface of the molded product assumes an unvulcanized state unless the vulcanizer is one of only a small number of members selected from the acyl type organic peroxides, such as, for example, 2,4-dichlorobenzoyl peroxide or o-chlorobenzoyl peroxide. The 2,4-dichlorobenzoyl peroxide which is usable in HAV has the disadvantage that 2,4-dichlorobenzoic acid, the product of decomposition thereof, induces the phenomenon of blooming on the surface of the molded elastomer product and seriously impairs its outward appearance. Moreover, the acyl type peroxides have the disadvantage that since these peroxides are transformed by decomposition into carboxylic acids, they have an adverse effect on the heat resistance of silicone elastomer. To avoid this disadvantage, there is adopted a method of subjecting the molded product to a subsequent protracted heating (post-vulcanization).

In contrast, the non-acyl type peroxides which are transformed by decomposition into alcohols fail to give desired vulcanization by HAV, although they do refrain from producing any adverse effect on the silicone elastomer. When a conventional silicone elastomer composition incorporates therein carbon black for the purpose of permitting production of an electroconductive silicone elastomer, the vulcanization of the silicone elastomer composition by HAV cannot be accomplished by either a non-acyl type peroxide or an acyl type peroxide.

As a means of solving the disadvantage described above, there may be cited the method which effects the desired molding by mixing a vinyl group-containing polyorganosiloxane with a polyorganohydrogensiloxane and subjecting the resultant mixture to addition reaction using a platinum compound as a catalyst. Although this method permits vulcanization to be performed by HAV, it has the disadvantage that the elastomer composition incorporating this catalyst is deficient in stability to withstand aging at room temperature and is solidified into elastomer before it is molded into a given shape. Further, the platinum compound used as the catalyst is liable to be poisoned by sulfur or antioxidants which are generally used in most organic rubber composition. When the elastomer composition is molded in the same molding device as is used for organic rubber, the sulfur and antioxidants which remain on the molding device may possibly inactivate the catalyst.

In view of the various disadvantages mentioned above, the desirability of developing a silicone elastomer which can be vulcanized by HAV using a non-acyl type peroxide has found enthusiastic recognition.

SUMMARY OF THE INVENTION

The present inventors conducted a diligent study in search of a silicone elastomer capable of being vulcanized by HAV using a non-acyl type peroxide. They have consequently found a silicone elastomer composition possessing novel crosslinking points and accomplished this invention as a result.

To be specific, this invention relates to a silicone elastomer composition, comprising:

(A) 100 parts by weight of a polyorganosiloxane having a polymerization degree of at least 100, wherein the organic groups are selected from monovalent substituted and unsubstituted hydrocarbon groups and are attached to silicon atoms at a rate, on average, in the range of 1.98 to 2.02 per silicon atom, and at least two of the organic groups are monovalent hydrocarbon groups possessing at least five carbon atoms and a carbon-carbon double bond bonding to a silicon atom via at least one carbon atom, (B) 5 to 200 parts by weight of an inorganic filler having a specific surface area of at least 50 m$^2$/g, and (C) 0.05 to 15 parts by weight of an organic peroxide.

DESCRIPTION OF THE INVENTION

The polyorganosiloxane (A) to be used in the present invention is represented by the general formula:

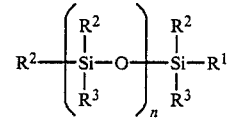

It may contain some R SiO$_{3/2}$ units or SiO$_2$ units in the structure thereof. In the formula, R$^2$ and R$^3$ stand for the same or different monovalent organic groups to be selected from substituted and unsubstituted monovalent hydrocarbon groups. R$^1$ stands for an organic group selected from the same class of monovalent hydrocarbon groups as R$^2$ and R$^3$, and the R$^1$s may also be partly or wholly hydroxyl groups or alkoxy groups.

Specific examples of the monovalent hydrocarbon groups include alkyl groups such as methyl, ethyl, propyl, hexyl, and decyl groups; alkenyl groups such as vinyl and allyl groups; aryl groups such as phenyl and tolyl groups; aralkyl groups such as β-phenylethyl and β-phenylpropyl groups; and substituted hydrocarbon groups such as chloromethyl, cyanoethyl, trifluoropropyl, and chlorophenyl groups. To fulfill the object of this invention, the polyorganosiloxane (A) in the silicone elastomer composition is required to contain in the structure thereof at least two hydrocarbon groups possessing at least five carbon atoms and possessing a carbon-carbon double bond bonding to a silicon atom via at least one carbon atom. Specific examples of such hydrocarbon groups include ethylidene norbornyl, methylene norbornyl, dicyclopentenyl, 4-pentenyl, 4-hexenyl, and cyclooctenyl groups. Such hydrocarbon groups can be of just one species or two or more species. From the standpoint of availability of raw material and reactivity of double bond, alkylidene norbornyl groups prove to be particularly desirable.

The silicone elastomer composition of this invention cannot be vulcanized by HAV using an alkyl type peroxide when the polyorganosiloxane contains zero or just one hydrocarbon group possessing at least five carbon atoms and a carbon-carbon double bond bonding to a silicon atom via at least one carbon atom within the molecular unit. The polyorganoxiloxane is required to contain at least two such hydrocarbon groups per molecule. The number of the hydrocarbon groups in the molecular unit had no upper limit in particular. For the resultant silicone elastomer to acquire satisfactory properties, these hydrocarbon groups should be present in a concentration of 0.05 to 5 mol % based on all the organic groups bonded to silicon atoms in the molecule.

The positions at which these groups are attached are not specifically limited. The groups may be bonded to silicon atoms either in the internal part or at the terminal units of the molecular chain.

The number of organic groups bonded to silicon atoms of polyorganosiloxane (A) is in the range of 1.98 to 2.02 per silicon atom, on average. If the number of organic groups is less than 1.98, the resultant silicone elastomer composition fails to constitute a satisfactory elastomer. If the number exceeds 2.02, the polyorganosiloxane cannot be obtained with a polymerization degree exceeding 100.

For the resultant silicone elastomer composition to impart satisfactory mechanical properties, the polymerization degree (n+1) of polyorganosiloxane (A) is required to exceed 100, preferably 1,000. In consideration of the ease of kneading the components in preparation of a homogeneous composition, the polymerization degree is preferably in the range of 2,000 to 20,000.

The inorganic filler (B) used in this invention is intended as a component for imparting various properties, particularly mechanical strength, to shaped articles of silicone elastomer obtained from the composition of the present invention. For the mechanical strength so imparted to be sufficient, the specific surface area of the inorganic filler is required to exceed 50 m$^2$/g and desirably falls in the range of 100 to 300 m$^2$/g.

Examples of inorganic fillers answering the foregoing description are reinforcing silica such as fumed silica and precipitated silica, and various types of carbon black such as furnace black, channel black, thermal black, and acetylene black which are usable for particular purposes. The inorganic filler can be used in its unmodified form or it may be given a surface treatment as with an organosilicon compound, an organic resin acid, or an organic resin acid salt before it is put to use.

The amount of the inorganic filler (B) used in the composition is in the range of 5 to 200 parts by weight per 100 parts by weight of polyorganosiloxane (A). If the amount of (B) is less than 5 parts by weight, the reinforcement produced is not sufficient. If it exceeds 200 parts by weight, the workability of the composition is impaired.

The organic peroxide (C) used in this invention is a vulcanizer intended to cure the composition containing polyorganosiloxane (A) and inorganic filler (B).

It has been well known as a vulcanizer for conventional vinyl group-containing thermosetting silicone elastomer compositions. Specific examples of the organic peroxide include acyl type peroxides such as benzoyl peroxide, p-chlorobenzoyl peroxide, o-chlorobenzoyl peroxide, and 2,4-dichlorobenzoyl peroxide, and non-acyl type peroxides such as di-t-butyl peroxide, 2,5-dimethyl-2,5-di(t-butylperoxy) hexane, 2,5-dimethyl-2,5-di(t-butylperoxy)-3-hexine, 1,3-bis(t-butylperoxypropyl)-benzene, 1,1-di(t-butylperoxy)-3,5,5-trimethyl cyclohexane, t-butyl- peroxybenzoate, t-butyl peroxybenzoate, t-butyl peroxyisopropyl carbonate, and dicumyl peroxide. Just one organic peroxide or a mixture of two or more organic peroxides can be used in this invention. Of the organic peroxides cited above, use of a non-acyl type peroxide proves more advantageous because it can be neglect the subsequent step of after-vulcanization.

The amount of organic peroxide (C) to be incorporated is in the range of 0.05 to 15 parts by weight per 100 parts by weight of polyorganosiloxane (A). If the amount of organic peroxide (C) incorporated is less than 0.05 part by weight, the vulcanization is not sufficiently effected. If this amount exceeds 15 parts by weight, the excess of the organic peroxide brings about no special effect and does harm to the physical properties of the molded silicone elastomer product.

The silicone elastomer composition of the present invention permits a vinyl group-containing polysiloxane such as polymethylvinylsiloxane or polymethylphenyl-vinylsiloxane to be used therein as a base polymer in combination with component (A). In addition to components (A) through (C), the silicone elastomer composition may also incorporate ground quarts, diatomaceous earth, titanium dioxide, aluminum oxide, zinc oxide, magnesium oxide, magnesium carbonate, calcium carbonate, magnesium silicate, aluminum sulfate, calcium sulfate, barium sulfate, mica, asbestos, and glass powder. It may further incorporate therein a heat-resistance improver, a flame retardant, a vulcanization accelerator, a processing acid, coloring matter, etc. known to the art.

The silicone elastomer composition of this invention is obtained by putting together the aforementioned components (A) through (C) and optionally various additives and homogeneously kneading them. This silicone elastomer composition, on exposure to heat, is turned into an elastomer.

EXAMPLES

The present invention will now be described more specifically with reference to working examples. Wherever "parts" are mentioned in the examples, they are "parts" by weight.

EXAMPLES 1-8

A mixture consisting of 296 parts of octamethylcyclotetrasiloxane, 16.8 parts of heptamethyl ethylidene norbornyl cyclotetrasiloxane, and 0.16 part of decamethyltetrasiloxane was heated at 140° to 150° C. and, with the addition of 0.007 part of potassium hydroxide, caused to polymerize for 15 hours, and then neutralized by addition of 0.004 part of phosphoric acid. The product thus obtained was polyorganosioxane containing 1 mol % of methyl ethylidene norbornyl siloxy units and having a polymerization degree of 8,000.

With a two-roll mill, 100 parts of the polyorganosiloxane, 5.0 parts of polymethylsiloxane terminated by hydroxyl groups and a viscosity of 50 cSt, and 50 parts of fumed silica having a specific surface area of 200 m²/g (produced by Japan Aerosil and sold under the trademark "Aerosil 200") were thoroughly kneaded. The resultant blend was mixed with varying amounts of an organic peroxide as indicated in Table 1. Consequently, there were obtained silicone elastomer composition samples, No. 1-No. 4 (Examples 1-4). These samples were subjected to press vulcanization with a press under a pressure of 150 kgf/cm² for 10 minutes at varying press temperatures indicated in Table 1 to obtain elastomer sheets 2 mm in thickness. These elastomer sheets were subjected to post-vulcanization under varying conditions indicated in Table 1 and then tested for hardness, tensile strength, elongation, and tear strength in accordance with the procedures specified by JIS C 2123. The results are shown in Table 1. Each of the silicone elastomer composition samples, No. 1-No. 4, was carefully roll-milled to remove entrapped bubbles to obtain a sheet about 5 mm in thickness. A test specimen about 25×50 mm in area was immediately cut off the rolled sheet and suspended in a hot air drier at 250° C. for five minutes to undergo HAV. The elastomer piece so produced was visually inspected as to condition of surface finish. The results are shown in Table 1.

COMPARATIVE EXPERIMENTS 1-4

For comparison, Comparative samples, No. 1-No. 4 (Comparative Experiments 1-4) were prepared, which consist of the same as silicone elastomer compositions Examples 1-4 except using a polyorganosiloxane containing 0.2 mol % or 1.0 mol % of methylvinyl siloxane units and having a polymerization degree of 8,000 prepared by heating a mixture consisting of 296 parts of octamethylcyclotetrasiloxane, 0.69 part or 3.5 parts of tetramethyltetravinylsiloxane and 0.16 part of decamethyltetrasiloxane at 140° to 150° C. with adding of 0.007 part of potassium hydroxide for 15 hours, and subsequently neutralizing by addition of 0.004 part of phosphoric acid, in the place of the aforementioned ethylidene norbornyl group-containing polyorganosiloxane. These comparative samples were similarly tested. The results are shown in Table 1. The comparative samples, No. 1-No. 2, used polyorganosiloxane containing 0.2 mol % of methylvinyl siloxane units and the comparative samples, No. 3-No. 4, used polyorganosiloxane containing 1.0 mol % of methylvinyl siloxane units.

TABLE 1

| Sample No. | Examples | | | | Comparative Experiments | | | |
|---|---|---|---|---|---|---|---|---|
| | 1 | 2 | 3 | 4 | 1 | 2 | 3 | 4 |
| Amount | | | | | | | | |
| Percumyl D *1 | 3.5 | — | — | — | 1.0 | — | 3.5 | — |
| Percadox 14/40 *2 | — | 5.0 | — | — | — | — | — | — |
| TC-8 *3 | — | — | 5.0 | — | — | — | — | — |
| TC-2 *4 | — | — | — | 5.0 | — | 2.5 | — | 5.0 |
| Press-vulcanization temperature °C. | 170 | 170 | 170 | 120 | 170 | 120 | 170 | 120 |
| Post-vulcanization temperature °C. | 200 | 200 | 200 | 150 | 200 | 150 | 200 | 150 |
| time h | 4 | 4 | 4 | 1 | 4 | 1 | 4 | 1 |
| Physical properties | | | | | | | | |
| Hardness (JIS A) | 66 | 64 | 67 | 58 | 68 | 64 | 94 | 91 |
| Tensile strength kgf/cm² | 91 | 93 | 89 | 80 | 97 | 99 | — | — |
| Elongation % | 300 | 300 | 290 | 290 | 380 | 390 | — *6 | — |
| State of surface after hot air vulcanization | ⊙ | ⊙ | ⊙ | ○ | X | ○ | X | ○ |

*1 Dicumyl peroxide 97% (Nippon Yushi Co.)
*2 1,3-Bis-(t-butyl peroxy-i-propyl) benzene 40% (Kayaku Nouri Co.)
*3 2,5-Dimethyl-2,5-di(t-butyl peroxy)hexane 50% (Toshiba Silicone Co.)
*4 2,4-Dichlorobenzoyl peroxide 50% (Toshiba Silicone Co.)
*5 X: The surface was in an unvulcanized state and sticky
○: The surface was in a vulcanized state, though showing the phenomenon of blooming with 2-dichlorobenzoic acid
⊙: The surface was in a thoroughly vulcanized non-sticky state, free from stain such as by blooming
*6 Extremely brittle and resinous and not elastomeric

EXAMPLES 5-6:

With a two-roll mill, 100 parts of the ethylidene norbornyl group-containing polyorganosiloxane obtained in Example 1-4 and 50 parts of acetylene black having a specific surface area of 70 m²/g (produced by Denki Kagaku Kogyo Co., Ltd. and sold under the trademark "Denka Black") were thoroughly kneaded. The resultant mixture was further mixed with varying amounts of organic peroxide as indicated in Table 2, to produce silicone elastomer composition samples, No. 5-6 (Examples 5-6). The samples were subjected to press vulcanization at a press temperature of 170° C. and under a pressure of 150 kgf/cm² for 10 minutes to produce sheets of elastomer 2 mm in thickness. These sheets were subjected to post-vulcanization at 200° C. for four hours and then tested for hardness, tensile strength, and elongation by the procedures defined by JIS C 2123. The results are shown in Table 2. Each of the silicone elastomer composition samples, No. 5-No. 6, was carefully roll-milled to remove entrapped bubbles to produce a sheet about 5 mm in thickness. A test piece about 25×50 mm in area was immediately cut out of the sheet and suspended in a hot air drier at 250° C. for five minutes to undergo HAV. The elastomer piece thus obtained was visually inspected for surface finish condition. The results are shown in Table 2.

COMPARATIVE EXPERIMENTS 5-7

For comparison, silicone elastomer composition samples, No. 5-No. 7 (Comparative Experiments 5-7) were prepared by using the same composition as described above, except that the polyorganosiloxane having 0.2 mol % or 1.0 mol % of methylvinyl siloxy units and having a polymerization degree of 8,000 similar to the polyorganosiloxane used in Comparative Experiments 1-4. They were similarly tested. The results are shown in Table 2. Comparative sample No. 5 used polyorganosiloxane containing 0.2 mol % of methylvinyl siloxy units and Comparative samples No. 6 and No. 7 each contained 1.0 mol % of methylvinyl siloxy units.

TABLE 2

|  | Examples | | Comparative Experiments | | |
|---|---|---|---|---|---|
| Sample No. | 5 | 6 | 5 | 6 | 7 |
| Amount | | | | | |
| Percumyl D* | 3.5 | — | — | 3.5 | — |
| TC-8 | — | 5.0 | 4.0 | — | 5.0 |
| Physical properties | | | | | |
| Hardness(JIS A) | 59 | 58 | 60 | 83 | 85 |
| Tensile strength kgf/cm$^2$ | 55 | 59 | 56 | 51 | 83 |
| Elongation % | 320 | 300 | 330 | 100 | 80 |
| State of surface after hot air* vulcanization | ⊙ | ⊙ | X | X | X |

*See Table 1

EXAMPLES 7-10

A mixture of 296 parts of octamethylcyclotetrasiloxane, 5.0 part of hexamethyl di(ethylidene norbornyl) cyclotetrasiloxane, 0.70 part of tetramethyltetravinylcyclotetrasiloxane, and 0.25 part of decamethyltetrasiloxane was heated to 140° to 150° C. and, with the addition of 0.007 part of potassium hydroxide, subjected to polymerization for 15 hours, and neutralized by addition of 0.004 part of posphoric acid. The product so obtained was a polyorganosiloxane containing 0.5 mol % of methylethylidene norbornyl siloxy units and 0.2 mol % of methylvinyl siloxy units and having a polymerization degree of 5,000.

With a two-roll mill, 100 parts of the polyorganosiloxane was thoroughly mixed with 50 parts of fumed silica (produced by Degussa Corp. and sold under the trademark "Aerosil R974"). The resultant mixture was further mixed with a varying amount of organic peroxide as indicated in Table 3 to produce silicone elastomer composition samples, No. 7–No. 10 (Examples 7-10). These samples were press vulcanized under a pressure of 150 kgf/cm$^2$ for 10 minutes at a varying press temperatures indicated in Table 3, to give rise to sheets of elastomer 2 mm in thickness. These sheets were subjected to post-vulcanization under varying conditions indicated in Table 3 and then tested for hardness, tensile strength, and elongation by the procedures specified by JIS C2123. The results are shown in Table 3. Each of the silicone elastomer composition samples, No. 7–No. 10, was carefully rolled to remove entrapped bubbles to produce a sheet about 5 mm in thickness. A test piece about 25×50 mm was immediately cut out of the sheet and suspended in a hot air drier at 250° C. for five minutes to undergo HAV. The elastomer piece so produced was visually inspected for surface finish condition. The results are shown in Table 3.

TABLE 3

| Sample No. | 7 | 8 | 9 | 10 |
|---|---|---|---|---|
| Amount | | | | |
| Percumyl D* | 2.5 | — | — | — |
| Percadox 14/40* | — | 5.0 | — | — |
| TC-8* | — | — | 4.5 | — |
| TC-1* | — | — | — | 3.0 |
| Press-vulcanization temperature °C. | 170 | 170 | 170 | 120 |
| Post-vulcanization temperature °C. | 200 | 200 | 200 | 150 |
| time h | 4 | 4 | 4 | 1 |
| Physical properties | | | | |
| Hardness(jis a) | 66 | 67 | 64 | 61 |
| Tensile strength | 91 | 86 | 83 | 77 |

TABLE 3-continued

| Sample No. | 7 | 8 | 9 | 10 |
|---|---|---|---|---|
| kgf/cm$^2$ | | | | |
| Elongation % | 230 | 280 | 250 | 300 |
| State of surface after hot air* vulcanization | ⊙ | ⊙ | ⊙ | ⊙ |

*See Table 1

EXAMPLE 11

A mixture consisting of 296 parts of octamethylcyclotetrasiloxane, 8.8 parts of pentamethyltriethylidene norbornyl cyclotetrasiloxane, 0.74 part of tetramethyltetravinylcyclotetrasiloxane, 42 parts of octaphenylcyclotetrasiloxane, and 0.22 part of decamethyltetrasiloxane was heated to 140° to 150° C. and, with the addition of 0.009 part of potassium hydroxide, subjected to polymerization for 20 hours, and neutralized by addition of 0.005 part of phosphoric acid. The product so obtained was a polyorganosiloxane containing 1.0 mol % of methyl ethylidene norbornyl siloxy units, 0.2 mol % of methylvinyl siloxy units, and 5.0 mol % diphenyl siloxy units, and having a polymerization degree of 6,000.

With a two-roll mill, 100 parts of the polyorganosiloxane was thoroughly blended with 3 parts of polyorganosiloxane terminated by methoxy groups and containing dimethyl siloxy units and diphenyl siloxy units at a molar ratio of 2:1 (visocosity 50 cSt), 40 parts of fumed silica having a specific surface area of 200 m$^2$/g, 20 parts of ground quarts, and 5 parts of zinc oxide. The resultant mixture was further mixed with varying amounts of organic peroxide as indicated in Table 4, to produce a silicone elastomer composition sample, No. 11. This sample was press vulcanized under a pressure of 150 kgf/cm$^2$ for 10 minutes at a press temperature of 170° C., to produce a sheet of elastomer 2 mm in thickness. This sheet was subjected to post-vulcanization at 200 C. for four hours and then tested for hardness, tensile strength, and elongation by the procedure specified by JIS C 2123. The results are shown in Table 4. The silicone elastomer composition sample no. 11 was carefully roll-milled to remove entrapped bubbles to produce a sheet about 5 mm in thickness. A test piece about 25×50 mm in area was immediately cut out of the sheet and suspended in a hot air drier at 250° C. for five minutes to undergo HAV. The resultant elastomer piece was visually inspected for surface finish condition. The results are shown in Table 4.

EXAMPLE 12

A mixture consisting of 296 parts of octamethylcyclotetrasiloxane, 13.7 parts of heptamethyl dicyclopentenyl cyclotetrasiloxane, and 0.13 part of decamethyltetrasiloxane was heated to 140° to 150° C. and, with the addition of 0.007 part of potassium hydroxide, subjected to polymerization for 15 hours, and then neutralized by addition of 0.004 part of phosphoric acid. The product so obtained was a polyorganosiloxane containing 0.8 mol % of methyldicyclopentenyl siloxy units and having a polymerization degree of 10,000.

With a two-roll mill, 100 parts of the polyorganosiloxane was thoroughly mixed with 50 parts of fumed silica having the surface thereof treated with diorganodichlorosilane and having a specific surface area of 110 m$^2$/g (produced by Degussa Corp. and sold under the trademark "Aerosil R972"), 10 parts of ground quarts, and 3 parts of zinc oxide. The resultant mixture was further mixed with an organic peroxide as indicated in Table 4, to give rise to a silicone elastomer composition sample, No. 12. This sample was press vulcanized under a pressure of 150 kgf/cm² for 10 minutes at a press temperature of 170° C., to produce a sheet of elastomer 2 mm in thickness. This sheet was subjected to post-vulcanization at 200 C for four hours and then tested for hardness, tensile strength, and elongation by the procedures specified by JIS C 2123. The results are shown in Table 4. The silicone elastomer composition sample, No. 12, was carefully roll-milled to remove entrapped bubbles to produce a sheet of elastomer about 5 mm in thickness. A test piece about 25×50 mm was immediately cut out of the sheet and suspended in a hot air drier at 250° C. for five minutes to undergo HAV. The elastomer piece thus obtained was visually inspected for surface finish condition. The results are shown in Table 4.

EXAMPLE 13

A mixture consisting of 296 parts of octamethylcyclotetrasiloxane, 7.4 parts of heptamethyl-4-(4-hexenyl)cyclotetrasiloxane, and 0.25 part of decamethyltetrasiloxane was heated to 140° to 150° C. and, with the addition of 0.007 part of potassium hydroxide, subjected to polymerization for 15 hours, and neutralized by addition of 0.004 part of phosphoric acid. The product so obtained was a polyorganosiloxane containing 0.5 mol % of methyl-(4-hexenyl)-siloxy units and having a polymerization degree of 5,000.

With a two-roll mill, 100 parts of the polyorganosiloxane was thoroughly mixed with 20 parts of fumed silica having a specific surface area of 200 m²/g, and 50 parts of furnace black having a specific surface area of 100 m²/g (produced by AA Chemical and sold under the trademark "Shoblack O"). The resultant mixture was further mixed with an organic peroxide as indicated in Table 4 to produce a silicone elastomer composition sample, No. 13. This sample was press vulcanized under a pressure of 150 kgf/cm² for 10 minutes at a press temperature of 170° C. to produce a sheet of elastomer 2 mm in thickness. This sheet was subjected to post-vulcanization at 200° C. for four hours and then tested for hardness, tensile strength, and elongation by the procedures specified by JIS C 2123. The results are shown in Table 4. This silicone elastomer composition sample No. 13 was carefully roll-milled to remove entrapped bubbles to produce a sheet about 5 mm in thickness. A test piece about 25×50 mm in area was immerdiately cut out of the sheet and suspended in a hot.air drier at 250° C. for five minutes to undergo HAV. The elastomer piece so obtained was visually inspected for surface finish condition. The results are shown in Table 4.

TABLE 4

| Sample No. | 11 | 12 | 13 |
|---|---|---|---|
| Amount | | | |
| Percumyl D* | 3.0 | — | — |
| Percadox 14/40* | — | — | 5.0 |
| TC-8* | — | 5.0 | — |
| Physical properties | | | |
| Hardness(JIS A) | 64 | 71 | 69 |
| Tensile strength kgf/cm² | 86 | 79 | 56 |
| Elongation % | 350 | 280 | 180 |
| State of surface after hot air vulcanization* | ⊙ | ⊙ | ⊙ |

*See Table 1

EXAMPLES 14–17 AND COMPARATIVE EXPERIMENT 8–9

In a Banbury mixer, the polymethyl(ethylidene norbornyl)siloxane having an ENB content of 5 mol % consisting of components shown in Table 5, butyl diene rubber and halogenated butyl were uniformly blended. With a roll, the resultant mixture and a resin vulcanizer added hereto were blended to prepare a composition. Then, the composition was vulcanized for 30 minutes under pressure of 150 kgf/cm² at a temperature of 150° C., to afford a vulcanized sheet 2 mm in thickness. The sheet was tested for physical properties by the method of JIS K 6301. The results are shown in Table 5.

For comparison, a polymethylvinylsiloxane having a vinyl group content of 0.5 mol %, and ethylenepropylenediene rubber were blended and vulcanized by the same procedure. The samples obtained for comprative experiments 6 and 7 were tested for physical properties.

It is noted from Table 5 that when the vulcanization was carried out using a resin vulcanizer, the polymethyl (ethylidene norbornyl)siloxane is superior to the conventional polymethylvinylsiloxane in co-vulcanizing property and, consequently, in mechanical strength. It is seen from example 16 that the polymethyl(ethylidene norbornyl)siloxane is more effective than polymethylvinyl siloxane alone is used.

TABLE 5

| | Example | | | Comparative Experiments | |
|---|---|---|---|---|---|
| Sample No. | 14 | 15 | 16 | 8 | 9 |
| Amount | | | | | |
| Polymethyl(ethylidene norbornyl)siloxane (Containing 0.5 mol % of ENB, having a polymerization degree of 7000) | 50 | 50 | — | — | — |
| Polymethyl(ethylidene norbornyl)siloxane (Containing 8 mol % of ENB, having a polymerization degree of 5500) | — | — | 10 | — | — |
| Polymethylvinylsiloxane (Containing 0.5 mol % of vinyl group) | — | — | 40 | 50 | 50 |
| Ethylenpropylene diene rubber | 50 | 50 | 50 | 50 | 50 |
| Silica | 5 | 25 | 25 | 50 | 25 |
| Carbon black | — | 34 | 34 | — | 34 |
| Naphathene oil | — | 17.5 | 17.5 | — | 17.5 |
| Zinc oxide | 5 | 5 | 5 | 5 | 5 |
| Stearic acid | 1 | 1 | 1 | 1 | 1 |
| Dicumyl peroxide* (Content 40%) | 6.8 | 6.8 | 6.8 | 6.8 | 6.8 |
| Sulfur | 0.3 | 0.3 | 0.3 | 0.3 | 0.3 |
| Physical properties | | | | | |
| Tensile strength kgf/cm² | 142 | 140 | 120 | 102 | 100 |
| Elongation % | 360 | 410 | 450 | 340 | 380 |
| Hardness (JIS A) | 65 | 62 | 69 | 67 | 63 |

*Percumyl(Nippon Yushi Co.)

EXAMPLES 18–19

Sheets 2 mm in thickness were prepared, which consists of the same as compositions Examples 11, 13 except using a polymethyl(dicyclo pentenyl)siloxane or a polymetyl(4-hexenyl)siloxane, in the place of the aforementioned polymethyl(ethylidene norbornyl)siloxanes. These samples were similarly tested. The results are shown in Table 6.

TABLE 6

| Sample No. | Example 18 | Example 19 |
|---|---|---|
| Amount | | |
| Polymethyl(ethylidene norbornyl)siloxane *1 | 50 | — |
| Polymethyl(4-hexenyl)siloxane *2 | — | 50 |
| Ethylenepropylenediene rubber *3 | 50 | 50 |
| Silica | 50 | 50 |
| Zinc oxide | 5 | 5 |
| Stearic acid | 1 | 1 |
| Sulfur | 0.3 | 0.3 |
| Dicumyl peroxide(Content 40%) | 6.8 | 6.8 |
| Physical properties | | |
| Tensile strength kgf/cm$^2$ | 135 | 149 |
| Elongation % | 410 | 270 |
| Hardness (JIS A) | 68 | 72 |

*1 Dicyclopetenyl group content in organic groups 0.5 mol % Methyl group content in organic groups 99.5 mol % Terminal group:Trimethylsiloxy unit
*2 4-hexenyl group content in organic groups 0.5 mol % methyl group content in organic groups 99.5 mol % Terminal group:Trimethylsiloxy unit
*3 Japan synthetic rubber JSR EP87X As described above, the silicone elastomer composition of this invention can be sufficiently vulcanized without reference to particular combination between the organic peroxide and the method of vulcanization. Even when the silicone elastomer composition of this invention incorporates carbon black for the purpose of producing an electroconductive silicon elastomer, it can be satisfactorily subjected to HAV using a non-acyl type peroxide.

The silicone elastomer composition of this invention finds utility in application to tubes, molded articles of profile extrusion, packings, and gaskets as well as sheathes for electric cables.

We claim:

1. A silicone elastomer composition, comprising:
   (A) 100 parts by weight of polyorganosiloxane having a polymerization degree of at least 100, wherein the organic groups are selected from monovalent substituted or unsubstituted hydrocarbon groups and are attached to silicon atoms at a rate, on average, in the range of 1.98 to 2.02 per silicon atom, and at least two of said organic groups are alkylidene norbornyl groups.
   (B) 5 to 200 parts by weight of an inorganic filler having a specific surface area of at least 50 m$^2$/g, and
   (C) 0.05 to 15 parts by weight of an organic peroxide.

2. A silicone elastomer composition according to claim 1, wherein the alkylidene norbornyl groups are present in the range of 0.05 to 5 mol % of said organic groups.

3. A silicone elastomer composition according to claim 1, wherein said polymerization degree of (A) is not less than 1,000.

4. A silicone elastomer composition according to claim 1, wherein said organic peroxide of (C) is a non-acyl type peroxide.

* * * * *